United States Patent [19]

Schmidt et al.

[11] 3,786,427

[45] Jan. 15, 1974

[54] DYNAMIC ADDRESS TRANSLATION REVERSED

[75] Inventors: George E. Schmidt; Joseph F. Schnell, both of Lake Katrine, N.Y.

[73] Assignee: International Business Machines Corporation, Armonk, N.Y.

[22] Filed: June 29, 1971

[21] Appl. No.: 157,912

[52] U.S. Cl. .......... 340/172.5
[51] Int. Cl. .......... G06f 9/20
[58] Field of Search .......... 340/172.5

[56] References Cited

UNITED STATES PATENTS

| | | | |
|---|---|---|---|
| 3,533,075 | 10/1970 | Johnson et al. | 340/172.5 |
| 3,675,215 | 7/1972 | Arnold et al. | 340/172.5 |
| 3,685,020 | 8/1972 | Meade | 340/172.5 |
| 3,693,165 | 9/1972 | Reiley | 340/172.5 |
| 3,339,183 | 8/1967 | Bock | 340/172.5 |
| 3,317,898 | 5/1967 | Hellerman | 340/172.5 |
| 3,569,938 | 3/1971 | Epen | 340/172.5 |
| 3,588,829 | 6/1971 | Boland | 340/172.5 |
| 3,470,540 | 9/1969 | Levy | 340/172.5 |
| 3,647,348 | 3/1972 | Smith et al. | 340/172.5 |
| 3,576,543 | 4/1971 | Melliar-Smith | 340/172.5 |
| 3,648,254 | 3/1972 | Beausoleil | 340/172.5 |
| 3,611,315 | 10/1971 | Murano | 340/172.5 |
| 3,631,405 | 12/1971 | Hoff et al. | 340/172.5 |

*Primary Examiner*—Harvey E. Springborn
*Attorney*—Edwin Lester

[57] ABSTRACT

In a virtual storage system, virtual storage may be divided into segments with each segment being divided into pages and each page containing a predetermined number of bytes. A storage control system is provided including a main storage unit, a high speed buffer storage unit operating in a virtual address mode and a dynamic address translation unit for controlling virtual page address to real page address translation including an associative storage for storing a plurality of virtual page addresses and associated real page addresses. A processing unit when making a storage request to the storage control system provides a virtual address which includes a virtual page portion containing a segment and page field and a byte portion. An I/O channel when making a storage request to the storage control system provides a real address which includes a real page portion and a byte portion. The high-speed buffer contains an address storage portion for storing virtual page addresses and a corresponding data storage portion for storing blocks of data. When a processing unit makes a request to the storage control system, the virtual page portion of the virtual address is compared with the virtual page portions stored in the buffer to determine whether the buffer may be utilized for data transmission with the processing unit. When an I/O channel makes a storage request to the storage control system the real page address is compared with the real page addresses stored in the translation unit and when a comparison is achieved a virtual page address corresponding to the real page address is provided to the buffer for further determination as to whether the buffer may be utilized for data transmission with the I/O channel. The storage control system also includes logic for controlling the transfer of address and data information between the processing unit, the I/O channel, the high-speed buffer unit and the main storage unit.

2 Claims, 11 Drawing Figures

INVENTORS
GEORGE E. SCHMIDT
JOSEPH F. SCHNELL

BY Edwin Lester
ATTORNEY

DYNAMIC ADDRESS TRANSLATION REVERSED

BACKGROUND OF THE INVENTION

The invention relates to computer storage systems and more particularly to virtual storage systems including a main storage, a high-speed buffer storage and a dynamic address translation unit for storing or fetching data when requested by one of a group of requesting sources.

In prior art storage control systems, such as taught by Kilburn et al. in U.S. Pat. Nos. 3,217,298; 3,218,611 and 3,248,703, the control of a virtual addressed buffered storage system requires a separate subroutine under the control of a transfer instruction store, which may be a read only storage, for controlling the transfer of address information and corresponding data between a main store (high-speed buffer) and a secondary store (low-speed high capacity storage device).

Kilburn requires in addition to the main storage and secondary storage, a working store and the transfer instruction store as well as a main store block register, a program block directory register, and a secondary store directory register. Further, Kilburn et al. teaches the use of a virtually addressed buffered storage system used only in conjunction with a central processing unit.

The major disadvantages of the prior art described are the large amounts of storage required for bookkeeping purposes, such as the directory and block registers and the transfer instruction store, as well as a failure to show how a virtual addressed buffer storage system could be used in a computing system wherein more than one device is contending for access to the storage system, such as, in a multiprocessing system where more than one processor contends for the same storage or in a modular computing system where I/O requests are handled through an I/O channel which has direct access to storage.

SUMMARY OF THE INVENTION

Time sharing systems which involve multiple programs usually require an extremely large storage capacity, a capacity which is larger than that of the actual main storage. The total storage capacity that can be addressed by a system is defined as the virtual storage for the system. Thus, for example, a 24 bit addressing system provides $2^{24}$ or approximately 16 million addressable bytes. For addressing purposes, the virtual storage may be divided into segments and each segment, in turn, divided into pages with each page consisting of a predetermined number of bytes. By fragmenting programs into paged segments, main storage can be allocated in paged increments. Therefore, pages can be located randomly throughout main storage and swapped in and out of main storage as pages are needed. Random location of pages necessitates the construction of page tables that reflect the actual or real location of the page. Thus, a single page table reflects the real locations of all the pages of a particular segment. Other page tables reflect the real locations of the pages associated with the other segments of the virtual storage. Accordingly, random locations of the page tables necessitates the construction of a segment table that reflects the actual or real location of the page tables. The segment table and page tables for a user are maintained in main storage and are utilized in translating a user's virtual address into a real address, i.e., an actual location in main storage of the required page. Address translation is the process of converting the virtual addresses into actual or real main storage addresses.

The format of a 24 bit virtual address may be divided into three fields designated as the segment field (bits 8–11), the page field (bits 12–19) and the byte field (bits 20–31). With such a format the virtual storage conceptually consists of 16 segments with each segment consisting of up to 256 pages and each page consisting of up to 4,096 bytes. Optionally, the segment field can be extended (bits 0–7) to provide a 32 bit addressing system which would consist of 4,096 segments. The segment field serves as an index to an entry in the segment table. The segment table entry contains a value which represents the base address of the page table associated with the segment designated by the segment field. The page field serves as an index to an entry in the page table. The page table entry contains a value which represents the actual or real address of the page. The displacement field undergoes no change during translation and is combined with the translated page address to form the actual or real main storage address. To avoid repeating this translation process for every storage reference, an associative storage is provided consisting of a set of registers. The associative storage is loaded with real page addresses and associated virtual page addresses (segment and page field of the virtual address) of the most recently referenced pages. Consequently, at the beginning of a translation, the virtual page address under translation is compared with all the virtual page addresses stored in the associative storage. If a comparison is found, the register which contains the compared virtual address provides the real page address as the translated address. The real page address is then combined with the byte displacement portion of the virtual address to form the real main storage address. If the address under translation is not found in the associative storage, a segment table-page table (two level) look up proceeds to find the corresponding real page address. After table referencing, the newly found real page address and its associated virtual page address is loaded into a register of the associative storage for future reference. A more complete description of virtual addressing and dynamic address translation such as employed with the present invention is contained in U.S. Pat. No. 3,533,075 to Johnson et al.

In a virtual storage system which includes a processing unit and channel controlled I/O units along with the main storage, the processing unit when making a request to main storage provides a virtual address which must be translated to a real address via the dynamic address translation unit before being applied to the control portion of main storage; whereas the channel when making a request to main storage provides a real address which may be directly applied to the control portion of main storage. With the advent of buffered storage systems, a high-speed buffer is provided in addition to the main storage. The purpose of the high speed buffer is to speed up requests for data. The buffer produces the effect of a faster main storage by storing selected blocks of main storage that are likely to be used next. When the addressed block is in the buffer a request to store or fetch information can be filled quickly. The overall effect of the buffer and the way it is used is to make main storage appear to have a faster cycle time.

To use the buffer, all requests from the processing unit are checked to see if the addressed location is in the buffer. If the buffer contains the addressed location and the request is a fetch request, the buffer is cycled and the requested data is sent to the processing unit, whereas if the request is a store request, the data is stored in both the buffer and main storage. If the buffer does not contain the addressed location, then the request is passed on to main storage for a full main storage cycle. In the case of a fetch request, the data accessed from main storage is passed back to the processing unit and is also stored in the buffer for future requests, whereas in the case of a store request, the data is stored only in main storage. In channel operations, a fetch request for main storage data does not involve the buffer; main storage is addressed and the data is sent to the requesting channel. However, in the case of storage requests, the buffer is checked to see if the addressed location is in the buffer and if it is, the channel data is stored in both the buffer and main storage. If the addressed location is not in the buffer, then the channel data is stored only in main storage.

One form of buffer that may be used for such a system consists of an address array and a corresponding data array. The data array may be arranged to contain blocks of 32 bytes or four double words while the address array is arranged to contain block addresses in a one-for-one correspondence to the data blocks in the data array. Accordingly, in a non virtual storage system, the block address portions of the address from the processing unit or the channel may be used to compare with the block addresses in the address array of the buffer to determine whether the addressed location is contained in the buffer. However, in a virtual storage system, where the processing unit provides virtual addresses and the channel provides real addresses, a problem arises as to how the buffer handles the different formatted addresses.

Accordingly, it is an object of the present invention to efficiently control data transfer in a virtual storage system.

It is a further object of the present invention to efficiently control address translation in a virtual storage system.

It is another object of the present invention to efficiently control data transfer between a buffered storage system and one of several contending data utilization devices.

Still another object of the present invention is to efficiently control data transfer in a buffered storage system operating in a virtual storage mode where several data processing devices are contending for the buffered storage system.

Still another object of the present invention is to control data transfer in a virtual storage system where one utilization device provides real addresses and another utilization device provides virtual addresses.

Still a further object of the present invention is to efficiently control address translation in a virtual addressed buffered storage system where several processors operating in different addressing modes contend for the storage system.

Still another object of the present invention is to efficiently control data transfer in a virtual addressed buffered storage system where an input/output channel provides real addresses to the system and a processing unit provides virtual addresses to the system.

Still a further object of the present invention is to efficiently control address translation in a virtual addressed buffered storage system so that real addresses provided by one utilization device are translated to virtual addresses for addressing the storage system.

In accordance with the present invention, the disadvantages of the prior art are overcome by apparatus and method for controlling data transfer in a virtually addressed buffered storage system where the apparatus includes, in addition to a central processing unit, a main storage, a buffer storage unit and an input/output channel, first gating means for determining the source of an information request to the storage system, compare means for determining whether the data to be transferred is in the data buffer storage unit, address translation means for obtaining address and data from main storage if the data is not in the data buffer storage unit and control means for determining the nature of the information request as between a data store operation and a data fetch operation and for further controlling the storing or fetching of data in either the data buffer storage unit or main storage.

A method for controlling the transfer of data in a buffered storage system embodying the present invention contains the steps of identifying the source of a data request as between two utilization devices such as a processing unit and an input/output channel, comparing an address in a first format from one of the utilization devices with correspondingly formatted addresses in a translation unit, providing an address in a second format corresponding to the address in the first format when a comparison is achieved between first formatted addresses, comparing the address in the second format with correspondingly formatted addresses in a buffer storage unit and providing data transmission between the utilization device and the buffer storage unit when a comparison is achieved between second formatted addresses.

The foregoing and other objects, features and advantages of the present invention will be apparent from the following description of a preferred embodiment of the invention as illustrated in the accompanying drawings.

DETAILED DESCRIPTION

Figure 1:
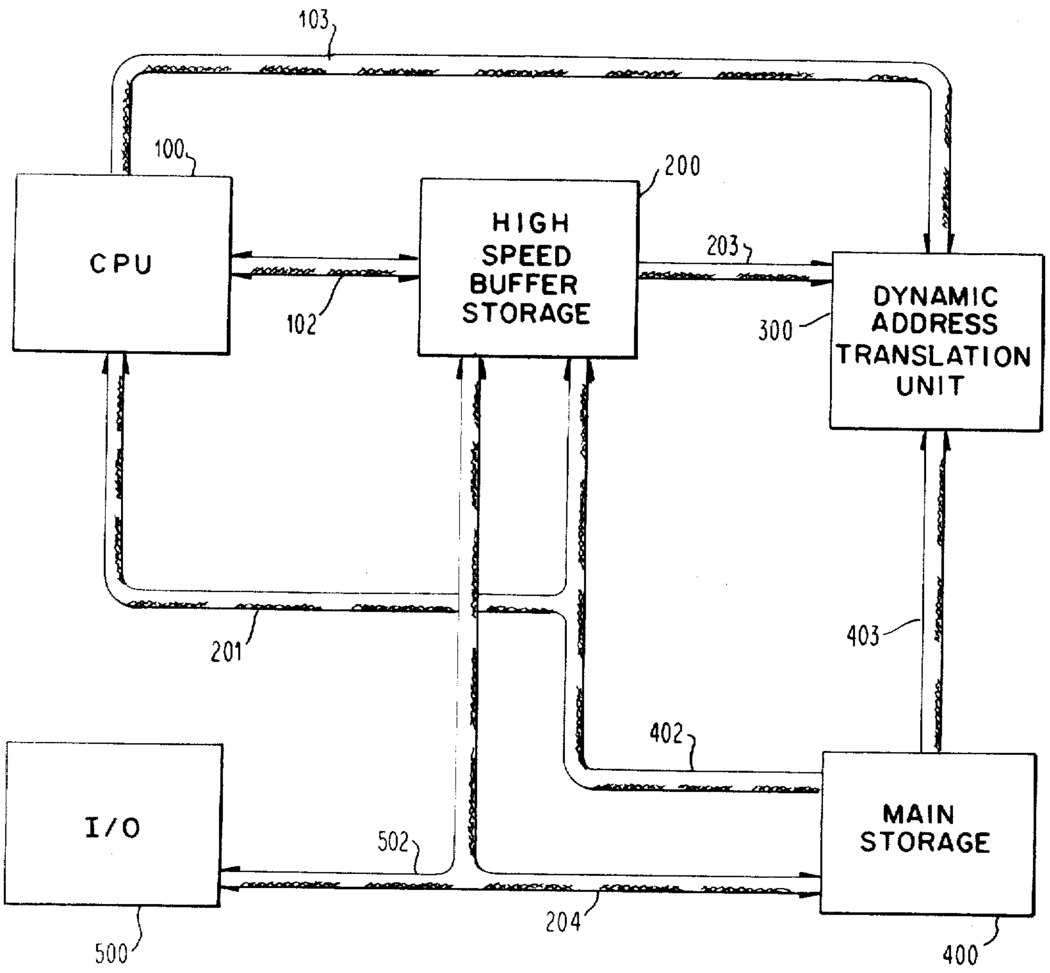
FIG. 1 is a block diagram of a computer system incorporating the present invention.

Since the invention resides primarily in the novel structural combination and the method of operation of well known computer circuits and devices, and not in the specific detailed structure thereof, the structure, control, and arrangement of these well known circuits and devices are illustrated in the drawing by use of readily understandable block representation and schematic diagrams, which only show the specific details pertinent to the present invention in order not to obscure the disclosure with structural details which will readily be apparent to those skilled in the art in view of the description herein. Also, various portions of these systems have been appropriately consolidated and simplified to stress those portions pertinent to the present invention.

Referring now to the block diagram of FIG. 1, in an exemplary computer system incorporating the buffered storage concept, central processing unit 100 communicates with dynamic address translation unit 300 by lines 103, with high-speed buffer storage 200 by lines 102 and with main storage by lines 201 and 402. Input/output channel 500 communicates with the high-speed buffer storage 200 and main storage 400 by lines 502 and 204. High-speed buffer storage 200 communicates with dynamic address translation unit 300 by lines 203. Main storage 400 communicates with dynamic address translation unit 300 by lines 403.

It is to be understood that main storage 400 may include within it many storage units of various types such as magnetic core, etc. Also, input/output channel 500 may include any of a plurality of input/output devices connected through one or more common channels.

Figure 5:
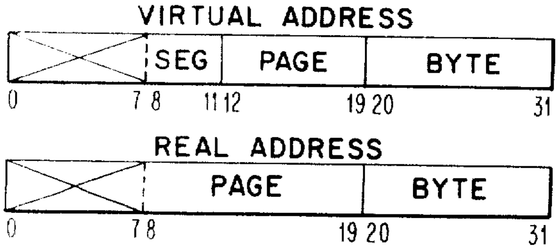
FIG. 5 is a diagram illustrating the format of a virtual address and a corresponding real address utilized in the present invention.

Central processing unit 100 may represent either a plurality of processors, each having its own program, or single processor working with a plurality of programs. These programs share the main storage unit 400 by use of a virtual address technique in which the processing unit 100 provides a virtual address and the input/output channel 500 provides a real address of the types shown in FIG. 5, respectively.

Referring now to FIGS. **2*a* and 2*b***, the logical interconnection of elements embodying the present invention is shown in greater detail.

To describe apparatus embodying the present invention, it is necessary with regard to CPU 100 to consider CPU fetch line 101, CPU store line 103, CPU address bus 105 and data bus IN 119, a data bus OUT 131.

To describe operations with I/O channel 500, channel fetch line 501, channel store line 507, channel address bus 509 and I/O data bus IN 519 and I/O data bus OUT 511 are relevant.

With respect to main storage 400, data bus IN 129, data bus OUT 401, I/O data bus IN 513 and I/O data bus OUT 405 are relevant. Additionally, storage address bus 421 is relevant to a description of the present invention.

CPU FETCH

Considering first a CPU fetch operation, CPU fetch line 101 is activated, enabling gate 102 to pass virtual address information, bits 8–31, presented on address bus 105 to output line 109. Lines 109 transmit the CPU virtual address information via OR circuits 106 to the output lines 111. The CPU virtual address (bit 8–31) is connected via lines 112 to inputs of AND gates 156 which, when enabled, transfers the CPU virtual address to the address translation unit 300 where an address translation operation is performed to translate the CPU virtual page address to a real page address. Bit 8–28 of the CPU virtual address are applied via lines 113 and 114 to the high speed buffer storage 200 where bits 8–19, the virtual page address, are compared with the virtual page addresses therein to determine whether the addressed location is contained in the buffer 200 and if it is bits 21–28 are used for addressing a location in the buffer 200 as more fully described hereinafter. Bits 20–31 of the CPU virtual address, representing the byte field, are applied via lines 113 and 115 to inputs of AND gates 148 to be used for addressing main storage in the event the addressed location is not found in the buffer 200. The virtual page address is also applied via lines 116 to compare 150. A second set of inputs to compare 150 is outputs 301 of the virtual page addresses contained in associative storage 320. Outputs presented also connected to AND gates 174. The output 151 of compare 150 is connected as an enabling input to AND gates 152, AND gate 158, AND gate 160, inverter 154, and AND gates 126 and 128.

When a compare is achieved in compare 150, inverter 154 disables AND gates 156 by line 155. This prevents CPU address information from being transmitted to address translator 310 on lines 157. Also, when a compare is achieved by compare 150, line 151 enables AND gates 152 to transmit real page address information which is pre sented on lines 303 to AND gates 146 along lines 153.

Thus, a compare between the CPU virtual page address information and a virtual page address from associative storage 320 causes the corresponding real page address information to be gated to AND gates 146 which combined with the byte address information at the inputs of gates 148 provides the real main storage address. Accordingly, gates 146 and 148, when enabled, will transmit the real main storage address via lines 147 and 149 to storage address bus 421 through OR circuits 420. During a CPU fetch operation gates 146 and 148 are enabled by an active signal being applied from AND gate 158 via OR circuit 162 to line 159.

AND circuit 158 is rendered effective upon the coincidence of a compare from compare 150 and a no compare on line 213 indicating the addressed location is not presently in the high-speed buffer 200.

If a compare is achieved in the high speed buffer 200, compare line 211 is active. Compare line 211 is connected as one input to AND gates 122. AND gates 122 have as other inputs CPU fetch line 101 and buffer data bus.

Hence, in a CPU fetch operation where compare line 211 is active and data is available on buffer data bus 221, AND gates 122 transmit the data along lines 123 through OR circuits 130 to CPU data bus 131.

When no compare is achieved in the high speed buffer 200, no compare line 213 is active to render AND circuit 158 effective, as explained above, to permit addressing of the main storage unit 400 and to present an active output on line 125 which is one enabling input to AND gates 126. When a virtual page address compare is achieved in compare 150, during a CPU fetch operation, lines 101 and 151 present the other enabling inputs to AND gates 126 to gate data from main storage data bus OUT on lines 401 to OR circuits 130 and 140 on output lines 127. OR circuits 130 present the data to the CPU on lines 131 as discussed above and OR circuits 140 present the data for storage to data buffer 220 on lines 141.

CPU STORE

When the operation to be performed is a CPU store operation, line 103 is active providing an enabling input to AND gates 104, AND gates 160, AND gates 120, and AND gates 128. CPU virtual address information on address bus 105 is transmitted through AND gates 104 on lines 107 and via OR circuits 106 to the output lines 111. The CPU virtual address information is used by AND gates 156, compare 150, AND gates 148 and the high speed buffer 200 in the same manner as that described for the CPU fetch operation.

Accordingly, when a virtual page address compare is achieved in the associative storage, line 151 presents an enable signal to AND gates 128. If no address compare is achieved in the high speed buffer 200, no compare line 213 presents a second enabling input on line 125 to AND gates 128. CPU data bus 119 is then gated to output lines 129 which present the data from the CPU to main storage 400. AND circuit 158 is again rendered effective upon the coincidence of a compare from compare 150 and the no compare on line 213 to permit, via OR circuit 162 and line 159, the enabling of AND gates 146 to pass the real main storage address to main storage unit 400. Where a buffer address compare is achieved, and line 211 is active, AND gates 120 are enabled allowing CPU data on lines 119 to be transmitted on lines 121 to OR circuits 140 which present the data on lines 141 to data buffers 220 and via data IN bus 129 to main storage unit 400. AND circuit 162 responds to active signals on the compare line 151, CPU store line 103 and buffer compare line 211 to pass an active signal, via OR circuit 162 and line 159, to enable AND gates 146 and 148 to pass the real main storage address to main storage unit 400.

In either CPU fetch or CPU store operations, when no virtual page address compare is achieved in compare 150, an address translation sequence is required to obtain a real page address which is stored with the corresponding virtual page address in the associative storage 320. Line 151, the output of compare 150, when inactive presents an active signal through inverter 154 on lines 155. This enables AND gates 156 which transmits CPU virtual page address information to address translator 310 on lines 157. Address translator 310 then initiates a translation sequence to main storage on lines 311 through OR circuit 420 to storage address bus 421. When the translated address, i.e., the real page address, is available on main storage data bus OUT 401, the address is presented to address translator 310 on lines 313. Address translator 310 then places the real page address and its corresponding virtual page address in associative array 320 by lines 315. The operation of the address translator is described in more detail in the cross-referenced U.S. Pat. No. 3,533,075.

Considering now a channel data request, the address and data controls relating to channel fetch and channel store operations will be described.

CHANNEL FETCH

When a channel fetch is initiated, line 501 is activated enabling gates 502 and gates 510. Gate 502 transmits channel real address information presented on lines 509 to OR circuits 420 on lines 503. This presents the channel real address to main storage. When the information requested is available on I/O data bus OUT lines 405, gates 510 transmit the data on lines 511 to channel 500 and the channel fetch operation is completed. It may be noted that the channel fetch operation does not involve the high speed buffer nor the address translation unit in any way, but rather communicates directly and solely with the main storage 400.

CHANNEL STORE

Considering a channel store operation, channel store line 507 becomes active, enabling AND gates 504, AND gates 512 and AND gates 14. AND gates 504 transmit channel real address information along lines 505 to inputs of OR circuits 420 which are connected to storage address bus 421. Bits 8–19 514. of the channel real address are applied to a first set of inputs of compare 170. Bits 21–28 of the channel real address are also applied via lines 506 to the high speed buffer 200 and are used for addressing a location in the buffer 200 as more fully described hereinafter. Compare 170 compares a channel real page address with the real page addresses stored in associative array 320 presented on lines 303 as second inputs to compare 170. When a real page address compare is achieved by compare 170, compare line 171 becomes active enabling gates 174 to transmit a corresponding virtual page address along lines 175 to address array 210 of high speed buffer 200.

The corresponding virtual page address found in associative array 320 is thus compared with the virtual page addresses in address array 210. If a buffer address compare is achieved and line 211 becomes activated gates 514 are enabled allowing I/O data bus IN formation on lines 519 to be transmitted on lines 515 to OR circuits 140 which provide inputs on lines 141 to data buffer 220. I/O data bus IN lines 519 are also gated through AND gates 512 to lines 513 which present the channel data to main storage 400. AND gates 512 are enabled during a channel store operation regardless of whether there is a buffer address compare present on line 211. This indicates that channel data will be stored in main storage under all circumstances during a channel store and will be stored in the high speed data buffer 220 only when a buffer address compare is achieved on line 211.

Figures 3, 3B:
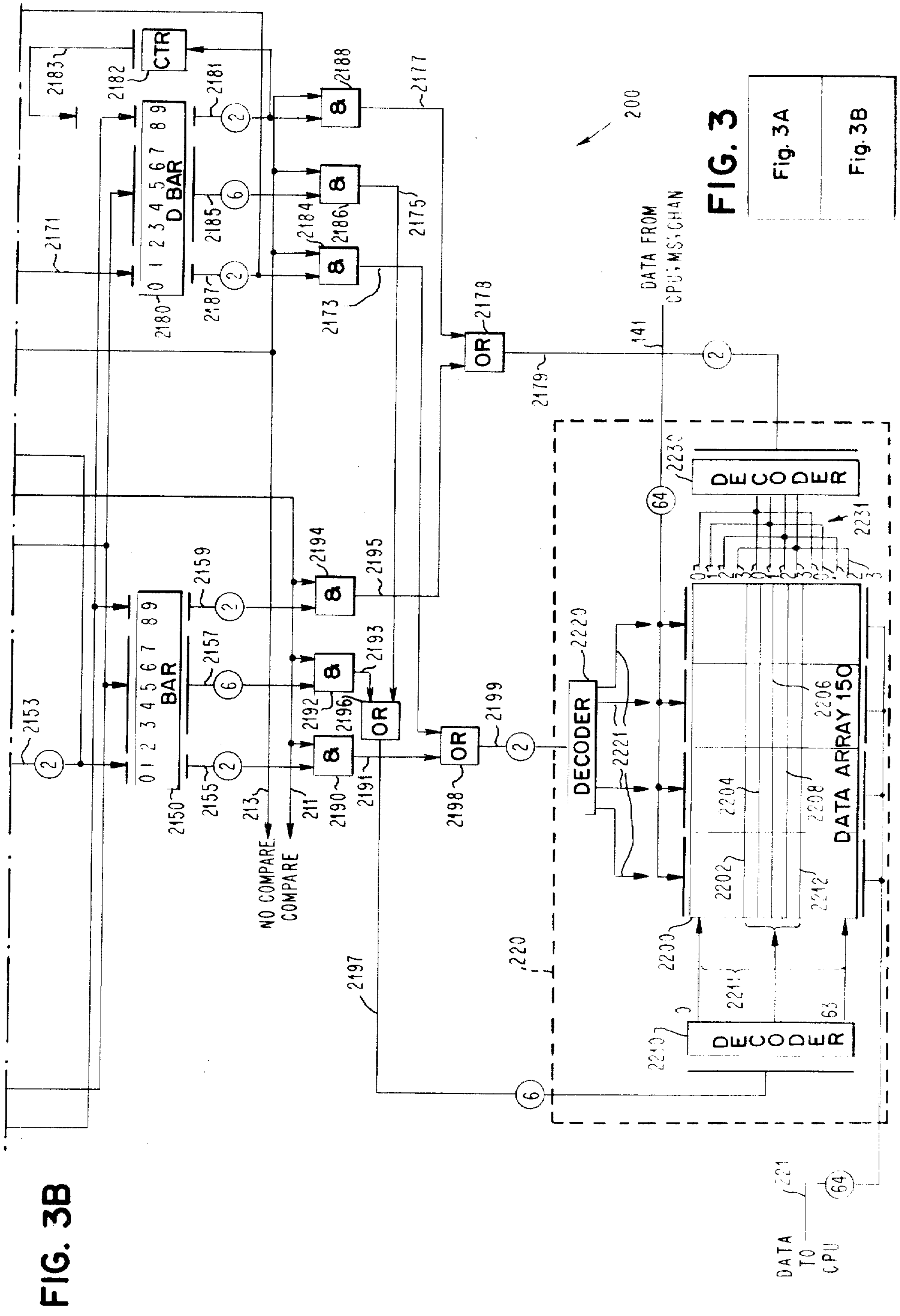
FIG. 3 shows the manner in which FIGS. 3*a* and 3*b* should be placed adjacent each other.
FIGS. 3*a* and 3*b* is a block diagram showing in greater detail the buffer storage unit and associated control gating in accordance with the present invention.
Figure 3A:
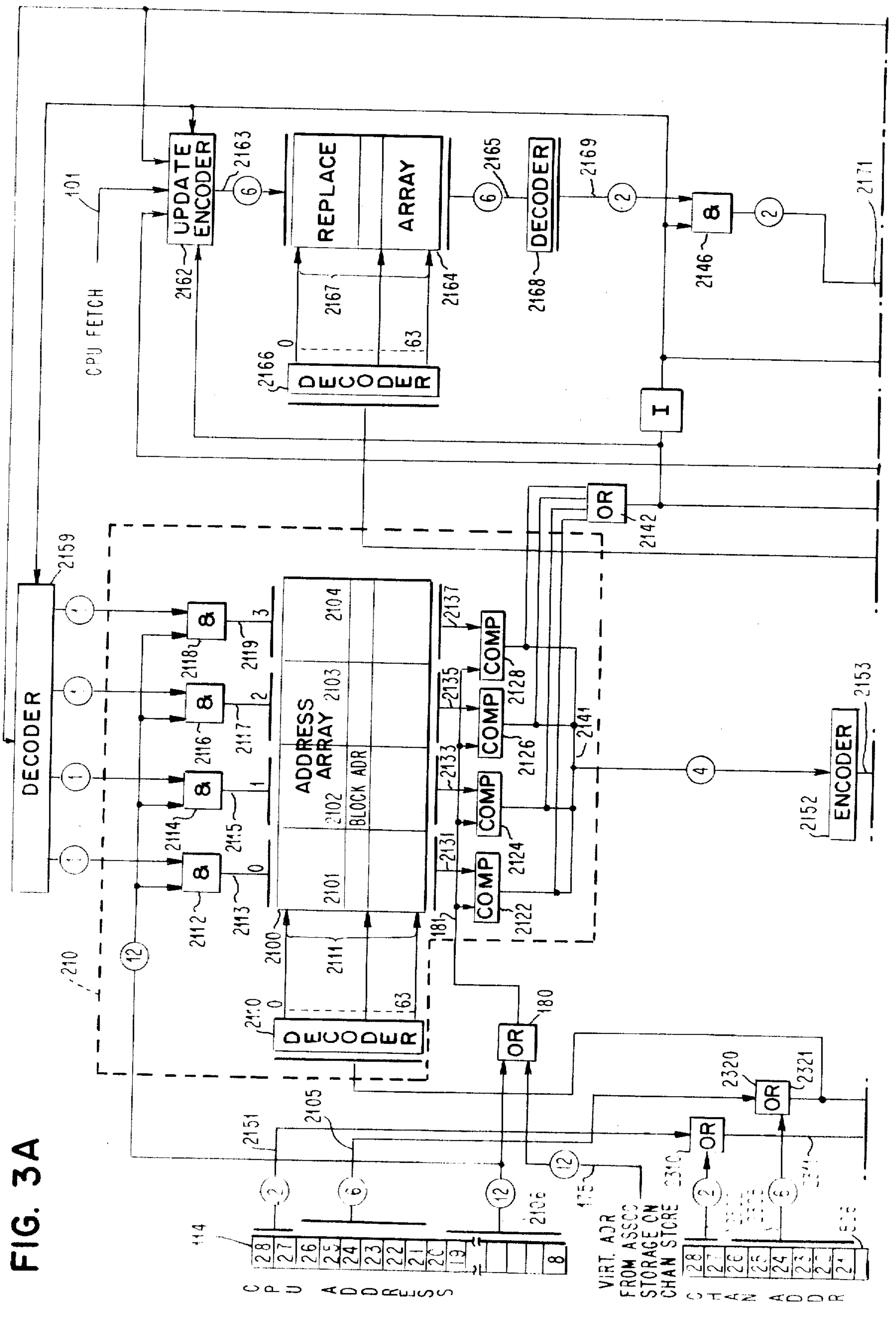

Referring now to FIGS. 3*a* and 3*b*, the high-speed buffer and associated control logic will be described in greater detail.

Address buffer 210 contains address array 2100, address decoder 2110, address gates 2112, 2114, 2116 and 2118, and buffer address compares 2122, 2124, 2126 and 2128.

The address array 2100 is organized in a matrix of 64 columns labeled 0 through 63 by four blocks labeled 0, 1, 2 and 3.

In an exemplary implementation, portions of CPU address bus 114 or channel address bus 506 are used to implement addressing of the storage control system. Thus, bits 21–26 from CPU address bus 114 during a CPU request or bits 21–26 of channel address bus 506 during a channel store request are connected to OR circuits 2320, the outputs of which are connected to the inputs of column decoder 2110 of address buffer 210 by lines 2321 and to bits 2–7 of buffer address register 2150, to bits 2–7 of duplicate buffer address register 2180 and to column decoder 2166 of replacement array 2164. The six address bits presented on lines 2321 are decoded into one of 64 columns and address a group of four blocks in the address array 2100 by lines 2111 and address a corresponding entry in the replacement array 2164. For example, a column of the address array 2100 may be addressed in which blocks 2101, 2102, 2103, and 2104 are accessed by the address information.

Virtual address information, bits 8–19, of CPU address bus 114 is transmitted to OR circuits 180 and to sets of AND gates 2112, 2114, 2116 and 2118 which, when one is enabled as a result of a no compare operation, transfers the presented virtual address for storage in a designated block of the addressed column of the address array 2100. The outputs of OR circuits 180 are connected to first inputs of compares 2122, 2124, 2126 and 2128. Second inputs to these compares are from the four blocks of the particular addressed column of address array 2100. This address information is connected to compares 2122, 2124, 2126 and 2128 by lines 2131, 2133, 2135 and 2137 respectively. If the virtual address presented compares with address information from any one of the four address blocks, a compare signal will appear on one of four lines 2141. Compare lines 2141 are connected to encoder 2152 so that when a compare is found between the presented virtual address and a virtual address stored in the addressed column of the address array 2100, the active one of the four compare lines is encoded to a two bit code which is presented by lines 2153 to bits 0 and 1 of buffer address register 2150 and to update encoder 2162. Compare lines 2141 are also connected via OR circuit 2142 to buffer address compare line 211. The buffer address compare line 211 is connected to AND gates 2190, 2192, 2194, update encoder 2162 and inverter 2144 which gives an output on no-compare line 213 when buffer compare line 211 is inactive. No-compare line 213 is connected as an input to AND gates 2146, 2184, 2186, 2188 and to update encoder 2162. Compare line 211 and no-compare line 213 are the primary enabling lines from the high-speed buffer storage for controlling the gating of data between CPU 100, buffer storage 200 and main storage 400.

Virtual address information, bits 27 and 28, of CPU address bus 114 or address information, bits 27 and 28, of channel address bus 506 are transmitted by lines 2151 and 2302, respectively, to OR circuits 2310, the outputs of which on lines 2311 are connected to bits 8 and 9 of buffer address register 2150 and bits 8 and 9 of duplicate buffer address register 2180. Address bits 8 and 9 of BAR 2150 or DBAR 2180 designate one of four double words within one of four blocks designated by address bits 0 and 1 of BAR 2150 or DBAR 2180 while address bits 2–7 of the BAR 2150 or DBAR 2180 designates one of the 64 columns of the data array 2200 containing the designated double word in the designated block.

The block information bits 0 and 1 of BAR 2150 are transmitted by lines 2155 to AND gates 2190, column information bits 2–7 are transmitted by lines 2157 to AND gates 2192 and double word information bits 8 and 9 are transmitted by lines 2159 to AND gates 2194.

When a compare is achieved between a presented virtual address and a virtual address in the address array 2100, an active signal on the compare line 211 is effective to enable AND gates 2190, 2192 and 2194 to pass the address bits via OR circuits 2198, 2196 and 2178, respectively, to block decoder 2220, column decoder 2210 and double word decoder 2230 of data buffer 220. Column decoder 2210 transmits column address selection information by lines 2211 to select one of 64 columns. Block decoder 2220 transmits block address selection information by lines 221 to select one of four blocks, such as block 2202. Double word decoder 2230 transmits double word address selection information by lines 2231 to select one of four double words, such as double word location 2204, 2206, 2208 or 2212. Therefore, when a compare is achieved with the presented virtual address, the contents of BAR 2150 are used to address a specific double word location within a selected block of a selected column in data buffer array 2200. In a CPU fetch operation, when a successful data buffer access is achieved, the double word present in the selected double word location, such as 2204 of a selected block of a selected column of data array 2200 will be available on lines 221 for transmission to CPU 100. In a CPU store or channel store operation, when a successful data buffer access is achieved, the data from CPU or I/O channel is presented on lines 141 as inputs to data buffer 220 to a selected double word, block and column of data buffer array 2200. The double word is thus stored in the data array 2200 so that high speed access to the data may be subsequently obtained.

Figure 6:
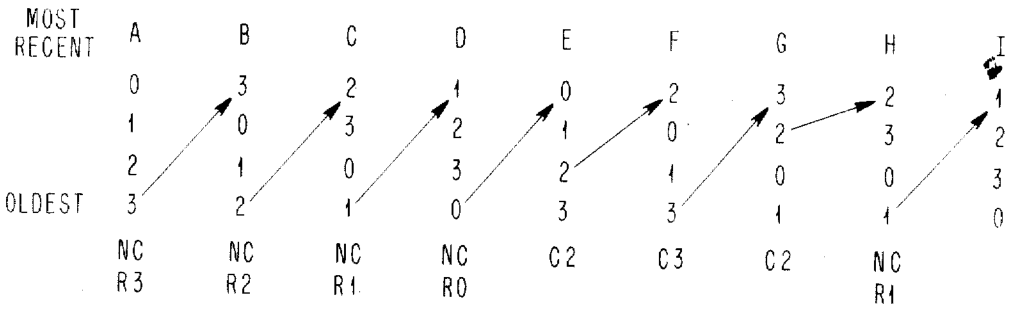
FIG. 6 is a diagram illustrating the activity of a replacement array incorporated in the present invention.

Replacement array 2164 is used to maintain knowledge of the activity of the data blocks within each of the buffer columns during CPU fetch operations. The replacement array 2164 effectively consists of 64 activity lists, one list for each column in the buffer. Referring to FIG. 6, each list can be thought of as containing four entries, one for each buffer block in its column. A block's entry is placed at the top of the list for its column when the buffer block is referenced. This approach insures that the block used longest ago within a given column is at the bottom of the list. When a block within a buffer column has to be assigned and loaded because the data requested is not in the buffer, the buffer block at the bottom of a column activity list is allocated. Thus, the more active data is maintained in the high-speed buffer 200. In the example shown in FIG. 6, column A indicates an activity wherein block 0 represents the most recent requested block and block 3 represents the oldest requested block of a particular column. If a request is made to the buffer and no compare (NC) is found then block 3 is designated as the block to be replaced and block 3 then moves to the top of the activity list while the other blocks numbers are pushed down as shown in column B. In the succeeding columns C and D successive no compares result when requests are made resulting in blocks 2, 1 and 0 being successively replaced and each moving to the top of the list and pushing down the other block numbers. In column E, a request to the data buffer 200 results in a compare with block 2. As a result, block 2 moves to the top of the list and blocks 0 and 1 are pushed down with block 3 still being designated as the oldest requested block. In a similar fashion, columns F, G, H and I illustrate the movement of the activity list when compares are next found in block 3 and 2 and then no compare requiring a replacement of block 1.

Each entry in the replacement array contains coded data which indicates the next block to be replaced in the high speed buffer when replacement is necessary. To maintain a current image of the block to be replaced, a replacement algorithm monitors the block usage of data in the high speed buffer 200. Accordingly, the replacement array information is updated for every CPU fetch operation.

Each entry in the replacement array contains a six bit code which identifies the replacement block number in accordance with the following table:

| Replace Block No. | Replace Array Content 01 | 02 | 03 | 12 | 13 | 23 |
|---|---|---|---|---|---|---|
| 3 (11) | X | X | 1 | X | 1 | 1 |
| 2 (10) | X | 1 | X | 1 | X | 0 |
| 1 (01) | 1 | X | X | 0 | 0 | X |
| 9 (00) | 0 | 0 | 0 | X | X | X |

Figure 7:
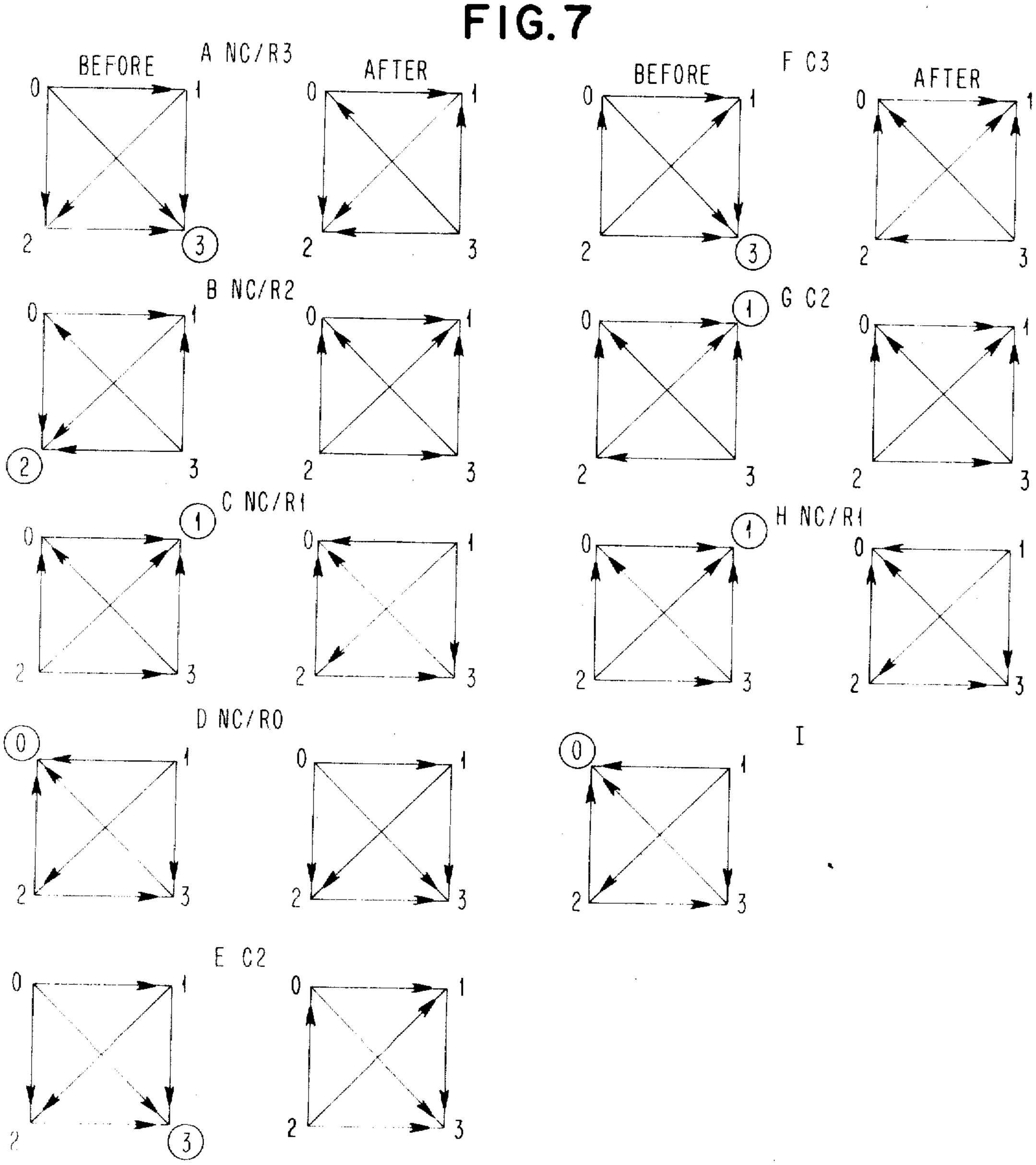
FIG. 7 is a diagram illustrating the replacement algorithm for the replacement array.

Referring to FIG. 7, there is shown a graphic example of the replacement algorithm. Each corner of the rectangle represents one of the four blocks to be replaced and the six connecting lines represents the six bit code identifying the block to be replaced. If a bit of the code is on, the line connected between two corners points to the higher number whereas if the bit is off the line points the the lower number e.g., if the line connecting block numbers 0 and 1 is on, the arrow will be pointing to the block number 1. The block number with the most lines pointing to it will be replaced first if a request finds no compare within the referenced column and the state of the bits pointing to that block number will be reversed. On the other hand when a request finds a compare within the referenced column then the state of those bits which point to the block number in which the compare was found will be reversed. Thus, in the example of FIG. 7, the reset state is shown indicating block number 3 as the replacement block since three bits 0–3, 1– 3 and 2–3 are pointing to that block number. Block number 2 would be the next oldest since two bits 0–2 and 1–2 are pointing to that block number; block number 1 would be the next oldest after block number 2 since one bit 0–1 is pointing to that block number and block number 0 would be the most recent used block since no bit is pointing to that block number. After block number 3 is replaced, the replacement algorithm updates the six bit code by resetting those bits pointing to block number 3. Accordingly, after updating, block number 2 would now be the first to be replaced, as shown, since it now has three bits pointing to that block number. THe remainder of FIG. 7 illustrates the change of the replacement array bits for one column of the replacement array 2164 for the example illustrated in FIG. 6.

Referring again to FIGS. 3*a* and 3*b* the information in an addressed column of replacement array 2164 is presented by lines 2165 to decoder 2168 which decodes the six lines into a two-bit message on lines 2169 which are connected as first inputs to AND gates 2146. The other input to AND gates 2146 being no-compare line 213, lines 2171 become active when no-compare has been achieved in the buffer address compare 2122, 2124, 2126 or 2128. Lines 2171 are connected to bits 0 and 1 of DBAR 2180. Bits 0 and 1 of DBAR 2180 are applied to decoder 2159 which is enabled when a no-compare signal appears on line 213. Decoder 2159 enables one of the AND gates 2112, 2114, 2116 or 2118 to gate the virtual address information on lines 2106 into one of four blocks at a particular column of the address array 2100.

The information as to which of the four blocks is enabled is also transmitted to the update encoder 2162 which then updates the six-bit message in replacement array 2164 at the appropriate column.

Thus, when the presented virtual address does not achieve a compare with the virtual addresses stored in address array 2100 during a CPU fetch operation, a replacement cycle occurs in which the presented virtual address is stored in an appropriate block at the addressed column in the address array 2100 and replacement array 2164 is updated.

The block information bits 0 and 1 of DBAR are transmitted by lines 2187 to AND gates 2184, column information bits 2–7 are transmitted by lines 2185 to AND gates 2186 and double word information bits 8 and 9 are transmitted by lines 2181 to AND gates 2188. DBAR 2180 has a counter 2182 associated with it which is employed to increment the double word selection bits for buffer store operations. The double word selection bits 8 and 9 are supplied to counter 2182 and incremented by the value of one each time a buffer store operation takes place. The incremented value is applied via lines 2183 back to bits 8 and 9 of DBAR 2180. Counter 2182 is necessitated by the fact that when information is transferred from main storage to the high speed buffer, the information is transferred a block at a time, i.e., four double words DW1, DW2, DW3 and DW4. If DW1 is called for, the individual double words DW1, DW2, DW3 and DW4 are supplied in that order. However, if, for example, DW3 is called for, it is supplied first followed by DW4, DW1 and DW2. Consequently, the words must be stored in this order in the buffer 200, and it is the function of the counter 2182 to maintain the order commencing at any point in the sequence of the double words DW1 through DW4. Table 2 below shows the binary setting of the counter 2182 for each double word in a block.

TABLE 2

| Double Word | Binary Value |
|---|---|
| 1 | 00 |
| 2 | 01 |
| 3 | 10 |
| 4 | 11 |

If a store operation is to take place in the buffer 200 commencing with double word DW3, the counter is set to the binary value of 10. For the next store operation the content of counter 2182 is incremented by the quantity of one to store the double word DW4 and this value is transferred to bits 8 and 9 of DBAR 2180. When the counter 2182 is incremented again it overflows and returns to the value 00 for storing the double word DW1 and this value is transferred to bits 8 and 9 of DBAR 2180. The counter 2182 is incremented next to the value 01 for storing double word DW2. Thus, it is seen that counter 2182 may be employed to commence with any of the double words DW1 through DW4 and store each one of the double words in its approproate buffer store address.

AND gates 2184, 2186 and 2188 are enabled by an active signal on the no-compare line 213. Accordingly, when no buffer address compare is achieved, AND gates 2184, 2186 and 2188 are enabled, allowing the address information in DBAR 2180 to be transmitted along lines 2173, to OR circuits 2198, lines 2175 to OR circuits 2196 and lines 2177 to OR circuits 2178. The address bits pass via OR circuits 2198, 2196 and 2178 to block decoder 2220, column decoder 2210 and double word decoder 2230 of the data buffer 220. Therefore, when no-compare is achieved with the presented virtual address, the contents of DBAR 2180 are used to address a specific double word location within a selected block of a selected column in the data buffer array 2200.

Thus, it can be seen that when a compare is achieved with the presented virtual address with an address from address array 2100, the contents of buffer address register 2150 are used to address a specific double word in data buffer array 2200 and when no address compare is achieved, the contents of DBAR 2180 are used to access a specific double word in data buffer array 2200. Also, when a compare is achieved during a CPU fetch operation the update encoder 2162 updates the addressed entry in the replacement array 2164 in accordance with the block number in which a compare was found whereas when no compare is achieved the update encoder 2162 updates the addressed entry in the replacement array 2164 in accordance with the block number identified by DBAR 2180.

It can be seen therefore that the apparatus described embodying the present invention controls access to main storage 400 and high-speed buffer storage 200 to efficiently transfer data in a virtually addressed buffered storage system.

OPERATION

For clarity, the operation of apparatus embodying the present invention will be described with primary reference to the flow chart, FIG. 4, coupled with references to FIGS. 2*a*, 2*b*, 3*a* and 3*b* when particular blocks of the apparatus are referenced.

Figure 4:
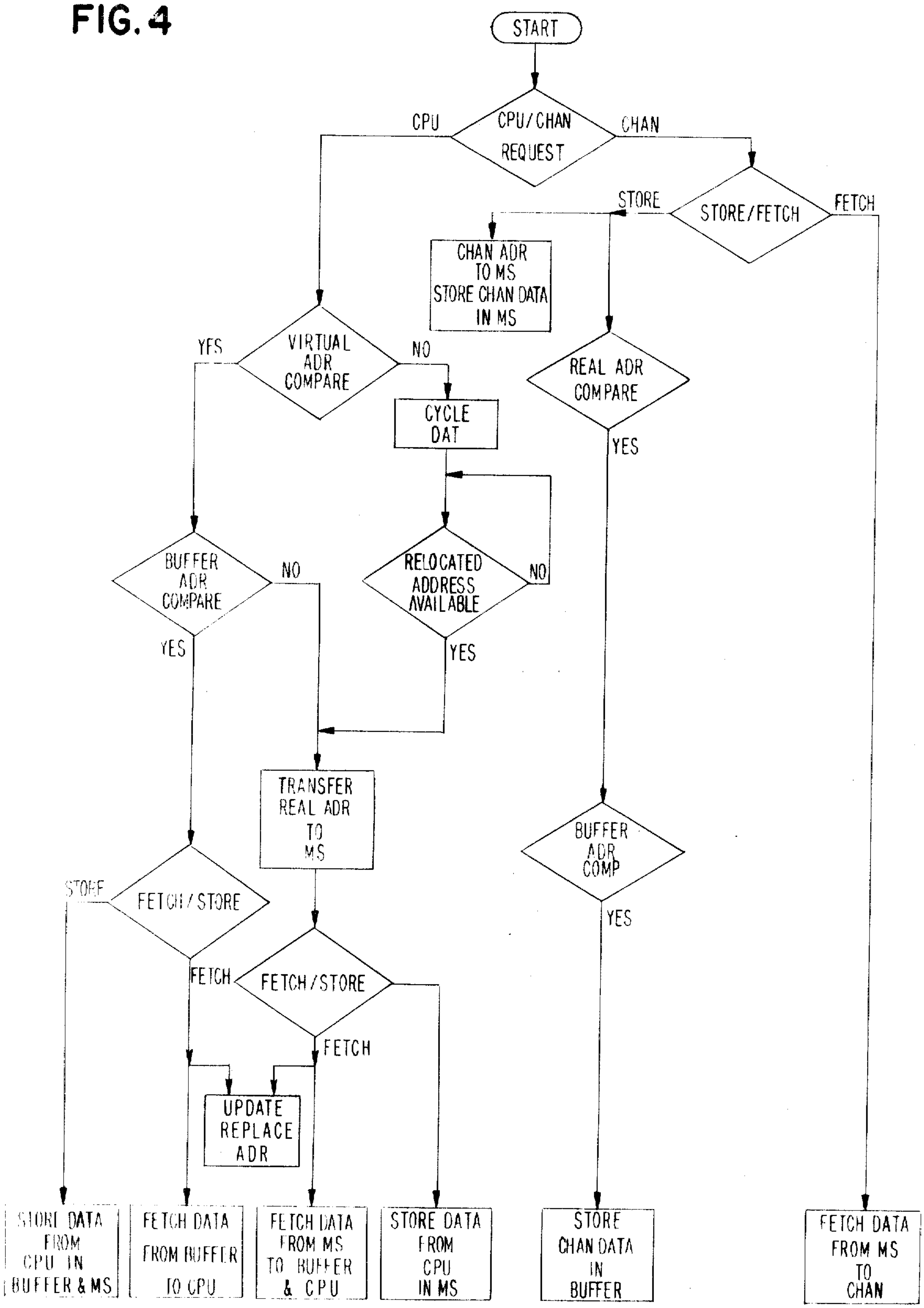
FIG. 4 is a flow diagram illustrating the functional steps performed in the operation of a storage system embodying the present invention.

Referring first to FIG. 4, when a storage request is initiated, the first determination must be whetner the request is emanating from CPU or from an I/O channel.

Figures 2, 2A:
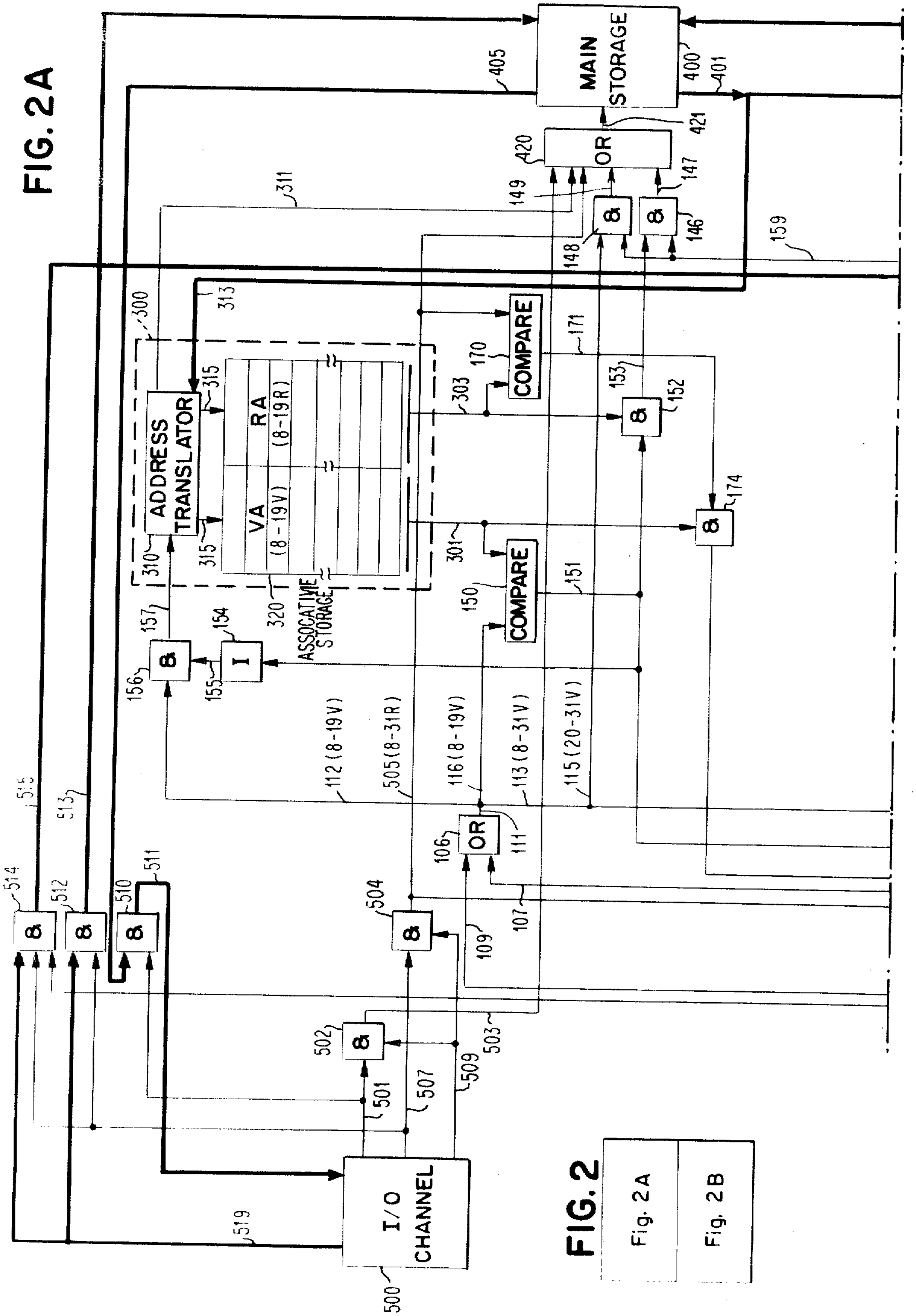
FIG. 2 shows the manner in which FIGS. 2*a* and 2*b* should be placed adjacent each other.
FIGS. 2*a* and 2*b* is a block diagram showing in greater detail the control of address and data information in a buffered storage system embodying the present invention.
Figure 2B:
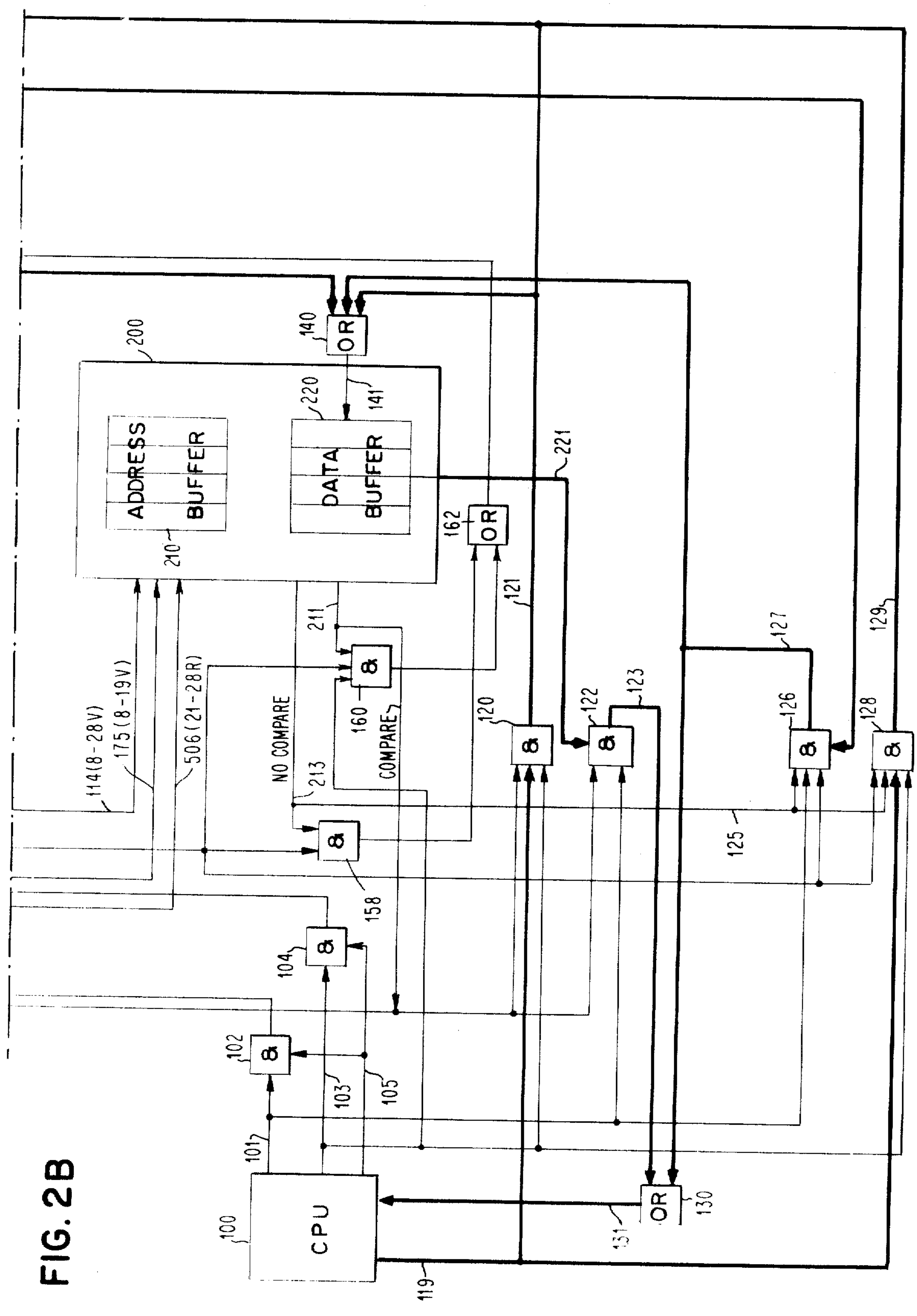

Referring to FIGS. 2*a* and 2*b*, it can be seen that this decision will be made automatically based upon which of lines 101, 103 or 501, 507 are active. If either of lines 101 or 103 are active, the storage request is identified as a CPU request and if lines 501 or 507 are active, the storage request is identified as an I/O channel storage request.

CPU REQUEST

For a CPU request, bits 8–19 of the CPU virtual address (the virtual page address) is gated to virtual address compare 150, represented by decision block VIRTUAL ADDRESS COMPARE in FIG. 4. If a virtual address compare is achieved, bits 8–19 of the CPU virtual address is then compared with an address contained in address buffer 219 as shown in FIG. 3*a*. If the buffer address compare is achieved, and buffer address compare line 211 is active, it can be seen that for a CPU fetch operation, the data required by CPU 100, which is contained in the high speed data buffer 220 at the block, column and double word location designated by BAR 2150 is gated out on lines 221 through gates 122 to CPU data 131. Also as previously described, update encoder 2162 responds to the CPU fetch, buffer compare and bits 0 and 1 output of encoder 2152 to update the contents of the corresponding column of the replacement array 2164. If CPU store line 103 is active, data on CPU bus 119 is gated through gates 120 to high speed buffer 220 by way of OR gates 140. In this situation, data from CPU is stored in the data array 2200 at the column, block and double word indicated by decoders 2210, 2220 and 2230 in accordance with the content of BAR 2150.

Referring again to FIG. 4, if the virtual address compare in compare 150 is not achieved, the address and data requested must be obtained from main storage through an address translation cycle. Therefore, inverter 154 actives AND gate 156 which then presents virtual address from CPU 100 to address translator 310 which then performs an address translation sequence to obtain the real page address from main storage 400 in a manner described in the Johnson et al patent referenced above. When the relocated address becomes available in associative array 320, a compare is achieved in virtual address compare 150 and corresponding real page address present on lines 303 is gated through AND gates 152 to AND gates 146.

Since in this condition, a virtual address compare is achieved in compare 150 but the address requested is not contained in the address buffer 210, line 213, the no-compare line, will be active and the conditions will be enabled for AND gate 158 to transmit via OR circuit 162 a transfer address to main storage signal on line 159, therefore, transferring the real main storage address through gates 146 and 148 to storage address bus 421 and thus to main storage.

If the CPU request is a fetch operation, and line 101 is active, data will be fetched from main storage 400 on data bus OUT 401 through gates 126 and stored in data buffer 220 at the block, column and double word location designated by DBAR 2180, as well as transmitted to CPU 100. Also, as previously described, update encoder 2162 responds to the CPU fetch, buffer no-compare and bits 0 and 1 of DBAR 2180 to update the contents of the corresponding column of the replacement array 2164.

If the CPU request is a store operation and line 103 is active, gates 128 will be enabled to transfer data from CPU 100 on bus 119 to main storage data bus IN 129 for storage in main storage 400.

CHANNEL REQUEST

Referring again to FIGS. 4 and 2*a*, when either of the channel request lines 501 for channel fetch or 507 for channel store are active, the request is identified as a channel request. If channel fetch line 501 is active, gates 510 are enabled allowing data on I/O data bus OUT line 405 from main storage 400 which is accessed by channel address via gate 502 and OR circuits 420 to be presented on lines 511 to I/O channel 500 to complete a channel fetch operation.

If the I/O channel request is identified as a channel store operation, gate 504, 512 and 514 are enabled to channel store line 507. Channel address information is transmitted on lines 505 directly to OR gates 420 for presentation to main storage 400 on storage address bus 421, while channel data on lines 519 is gated through gates 512 to I/O data bus IN lines 513, thus achieving a direct storage of channel information at the access location in main storage 400.

Concurrently, bits 8–19 of the channel address information is presented to one set of inputs of real address compare 170 where the channel address is compared with a real portion of all addresses stored in associative array 320. If no-compare is achieved between the presented channel address and the real addresses in the address array, no further buffer operation is performed. If, however, a real address compare is achieved, the corresponding virtual address is gated via gates 174, lines 175 and OR circuits 180 to buffer address compares 2122, 2124, 2126 and 2128 (shown in FIG. 3*a*) where the corresponding virtual address is compared with the block addresses stored in address buffer array 2100 at a column location determined by bits 21–26 of the channel address presented on lines 506.

If a buffer address compare is achieved, gates 514 are enabled allowing I/O data bus information to be transmitted on lines 515 via OR gates 140 to data buffer 220 by lines 141 where it is stored at the block, column and double word location designated by BAR 2150.

It can be seen, therefore, that when a real address compare and a buffer address compare is achieved in a channel store operation, channel data is stored in the data buffer as well as in main storage.

While the invention has been particularly shown and described with reference to a preferred embodiment thereof, it will be understood by those skilled in the art that various changes in form and detail may be made therein without departing from the spirit and scope of the invention.

What is claimed is:

1. Apparatus for controlling the transfer of data words in a virtual storage system comprising:

a main storage having a plurality of data word locations logically arranged into a plurality of columns of blocks of data word locations each column storing a plurality of blocks of data words, control means for input/output devices providing data word, store request and address signals, said address signal including a column address portion, a block address portion and a data word address portion, the block address portion corresponding to a real block address of a physical block location in said main storage, associative storage means storing real block address signals and associated virtual block address signals, first comparing means comparing the real block address portion of the address signal provided by said control means with said real block address signals stored in said associative storage means and producing a first match signal indicating that a virtual block address signal corresponding to the real block address signal provided by said control means is stored in said associative storage means, a buffer storage including:

a data storage means having a plurality of data word locations logically arranged into a plurality of columns of blocks of data word locations each column storing a plurality of main storage blocks of data words, the number of blocks of data word locations in said data storage means being a submultiple of the number of blocks of data word locations in said main storage, and a block address storage means having a plurality of word locations logically arranged into a plurality of columns of word locations corresponding to said plurality of columns of blocks of data word locations in said data storage means, each word location of said block address storage means storing a virtual block address signal identifying the main storage block of data words stored in the corresponding block of data word locations of said data storage means, addressing means for said block address storage means responsive to the column address portion of the address signal provided by said control means to read out a column of virtual block address signals, second comparing means, transfer means responsive to said first match signal to transfer the virtual block address signal in said associative storage means which corresponds with said real address signal provided by said control means to said second comparing means, said second comparing means comparing said virtual block address signal transferred from said associative storage means with said column of virtual block address signals readout from said block address storage means and producing a second match signal indicating that the addressed main storage block of data word locations is accessible from said data storage means, addressing means for said data storage means responsive to said second match signal and the column address portion and data word address portion of the address signal provided by said control means to access a data word location of said data storage means, means responsive to said second match and store request signals to transfer said data word signal from said control means to the accessed data word location of said data storage means, means responsive to said storage request signal to transfer the address signal provided by said control means to access a data word location of said storage, and means responsive to said storage request signal to transfer said data word signal from said control means to the accessed data word location of said main storage so that the data word provided by said control means is concurrently stored in said data storage means and said main storage.

2. Apparatus for controlling the transfer of data words in a virtual storage system comprising:

a main storage having a plurality of data word locations logically arranged into a plurality of columns of blocks of data word locations each being adapted to store a block of data words, processing means providing storage access request and address signals, control means for input/output devices providing storage access request and address signals, said address signals provided by said processing means and said control means including a column address portion, a block address portion of said address portion, the block address portion of said address signal provided by said processing means and said control means corresponding to a virtual block address and a real block address, respectively, of a physical block location in said main storage, associative storage means storing real block address signals and associative virtual block address signals, first comparing means comparing the real block address portion of the address signal provided by said control means with said real block address signals stored in said associative storage means and producing a first match signal indicating that a virtual block address signal corresponding to the real block address signal provided by said control means is stored in said associative storage means, a buffer storage including:

a data storage means having a plurality of data word locations logically arranged into a plurality of columns of blocks. of data word locations each column storing a plurality of main storage blocks of data words, the number of blocks of data word locations in said data storage means being a submultiple of the number of blocks of data word locations in said main storage, and a block address storage means having a plurality of word locations logically arranged into a plurality of columns of word locations corresponding to said plurality of columns of blocks of data word locations in said data storage means, each word location of said block address storage means storing a virtual block address signal identifying the main storage block of data words stored in the corresponding block of data word locations of said data storage means, addressing means for said block address storage means selectively responsive to the column address portion of the address signal provided by said processing means and said control means to read out a column of virtual block address signals, second comparing means, transfer means responsive to said first match signal to transfer the virtual block address signal in said associative storage means which corresponds with said real address signal provided by said control means to said second comparing means, said second comparing means selectively comparing the virtual block address signal provided by said processing means and the virtual address signal transferred from said associative storage means with said column of virtual block address signals read out from said block address storage means and producing a second match signal indicating that the addressed main storage block of data word locations is accessible from said data storage means, addressing means for said data storage means responsive to said second match signal and selectively responsive to the column address portion and data word address portion of the address signal provided by said processing means and said control means to access a data word location of said storage means, and means responsive to said second match signal and selectively responsive to said storage access request signal provided by said processing means and said control means to selectively control the transfer of a data word signal between said processing means and said control means and the accessed data word location of said data storage means.

* * * * *